No. 775,961. PATENTED NOV. 29, 1904.
S. J. BAXTER & R. O. MARTIN.
HORSE HAY RAKE.
APPLICATION FILED MAR. 16, 1904.
NO MODEL. 2 SHEETS—SHEET 1.

Witnesses
George Oltsch
Hugo Oltsch

Inventors
Seely J. Baxter and
Robert O. Martin
By Theodore Dalton
Atty.

No. 775,961. PATENTED NOV. 29, 1904.
S. J. BAXTER & R. O. MARTIN.
HORSE HAY RAKE.
APPLICATION FILED MAR. 16, 1904.
NO MODEL. 2 SHEETS—SHEET 2.
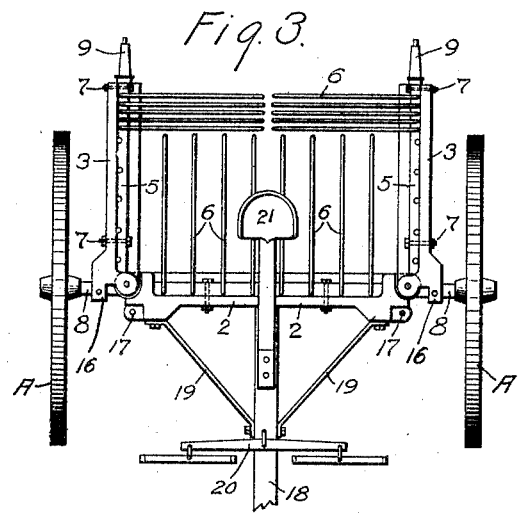
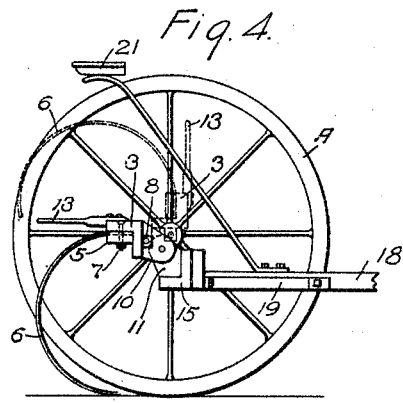
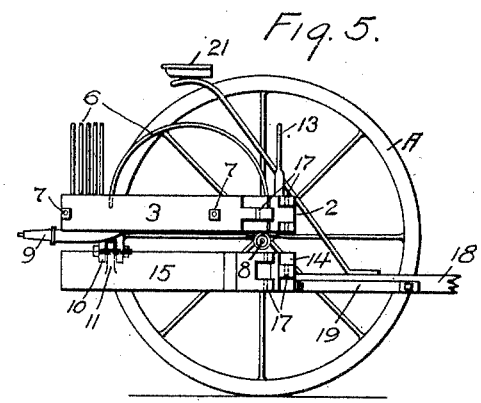
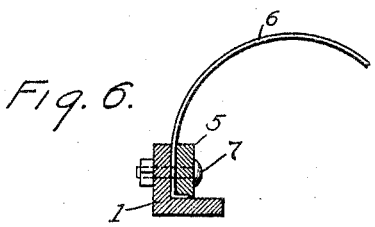
Witnesses:
George Oltsch
Hugo Oltsch
Seely J. Baxter and
Robert O. Martin
Inventors
By Thudne Alton
Atty.

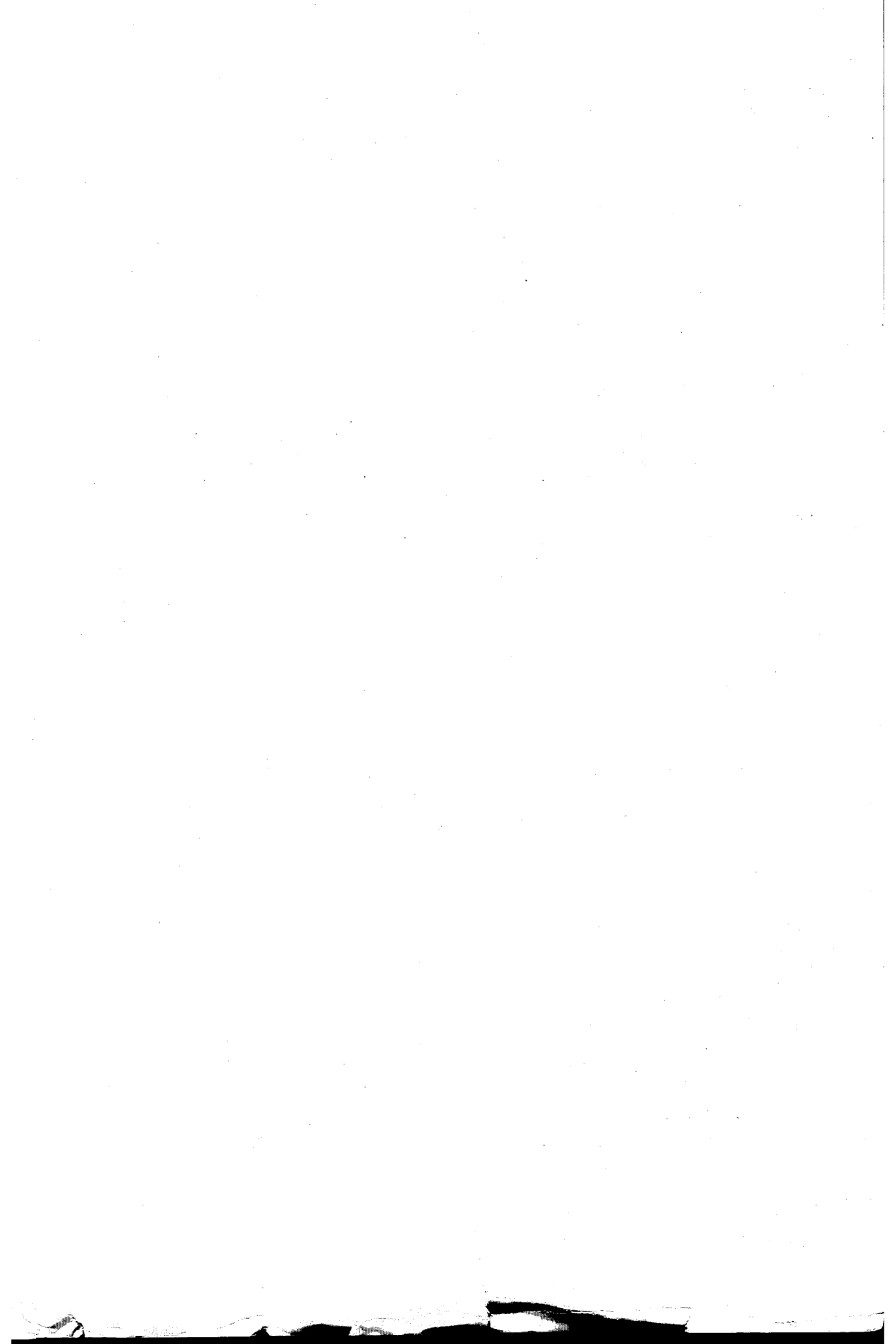

No. 775,961. Patented November 29, 1904.

UNITED STATES PATENT OFFICE.

SEELY J. BAXTER AND ROBERT O. MARTIN, OF NORMAN, OKLAHOMA TERRITORY; SAID MARTIN ASSIGNOR TO SAID BAXTER.

HORSE HAY-RAKE.

SPECIFICATION forming part of Letters Patent No. 775,961, dated November 29, 1904.

Application filed March 16, 1904. Serial No. 198,467. (No model.)

*To all whom it may concern:*

Be it known that we, SEELY J. BAXTER and ROBERT O. MARTIN, citizens of the United States, residing at Norman, in the county of Cleveland, Oklahoma Territory, have invented certain new and useful Improvements in Horse Hay-Rakes; and we do hereby declare the following to be a full, clear, and exact description of the invention, such as will enable others skilled in the art to which it appertains to make and use the same.

This invention relates to horse hay-rakes.

One of the objects of the invention is to provide a hay-rake which may be contracted laterally or reduced in width when not used as a rake, so as to permit it to be transported over narrow roads, lanes, or bridges or track with vehicles on ordinary road-beds and to also pass through narrow gates and barn-doors.

A further object of the invention resides in the novel arrangement and connection of the parts, which when in operative position are locked against possible contraction and whereby the rake-head and its tines must first be thrown out of operative position before the implement can be contracted.

Other objects and advantages of our invention will appear as the nature of the invention is better understood from the following description and the accompanying drawings, in which—

Figure 1:
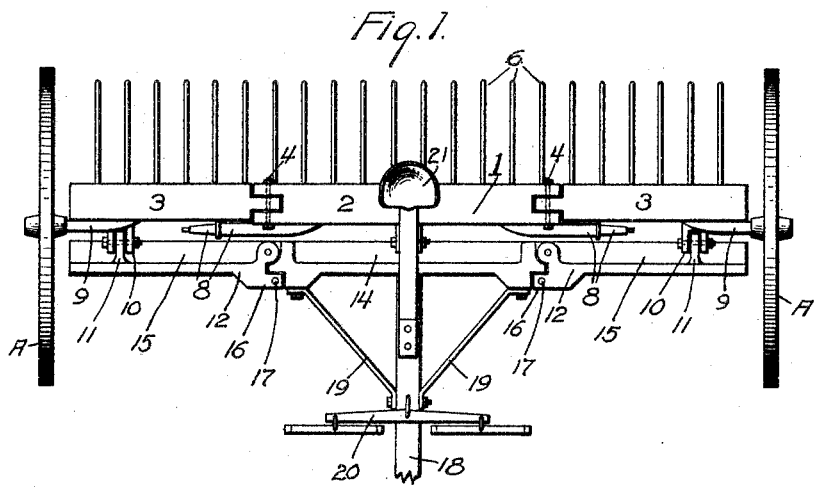
Figure 2:
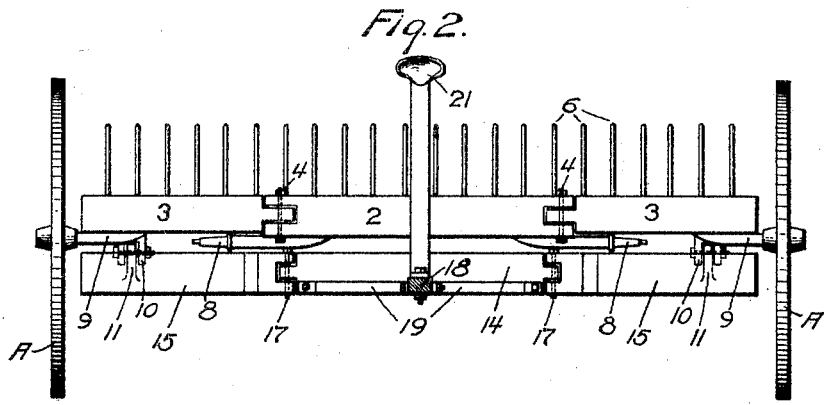

Figure 1 is a plan view of the horse hay-rake embodying all the features of our invention. Fig. 2 is a front elevation of the same with the rake-head and the tines carried thereby elevated to the position preparatory to contracting the same. Fig. 3 is a plan view with the parts folded to reduce the width of the rake to adapt it to be transported over narrow roads. Fig. 4 is a side elevation with one wheel removed, showing in dotted lines the position of the rake-head and the tines carried thereby when the parts are to be contracted; and Fig. 5 is a side elevation of Fig. 3 with one wheel removed, showing position of rake-head and draft-bar when unlocked. Fig. 6 is a detail in section of the rake-head, illustrating the manner of holding the tines therein.

Making renewed reference to the drawings, 1 designates a jointed rake-head which consists of a central section 2 and the foldable end sections 3, which are hinged to the ends of the central section by suitable bolts or pins 4, the ends of the central section being mortised transversely and the adjoining ends of the end sections having a tenon to fit within the mortise, whereby a firm strong hinge is established. Each section of the rake-head preferably consists of an L-shaped bar in cross-section, and within the recess thereof are fitted clamping-blocks 5, which are provided with suitable bolts 7 for clamping the blocks 5 to the sections of the rake-head, as shown in Fig. 5. At the outer ends of the end sections these clamping-blocks have a longitudinal groove or a plurality of grooves arranged close together in order that the tines 6 thereof may be assembled or grouped close together near each end when the end sections are forced rearwardly to convert the rake to a narrow tread, as shown in Fig. 3, and this may be accomplished by loosening or removing the clamping-bolts 7 and sliding the tines along the hinged end sections toward the ends thereof.

The jointed rake-head 1 carries two sets of spindles 8 8 and 9 9, the former of which are secured to the central section 2 and project beyond the ends thereof, and the latter are secured to the outer ends of the foldable sections 3 and project beyond the ends thereof.

Near the ends of the foldable sections 3 3 are ears 10 10, between which are pivoted lugs 11 of a draft-bar 12, suitable bolts being employed to pierce the ears and the lugs, as shown in Fig. 1, and with these lugs and ears as a fulcrum-point the rake-head, with the tines, may be rocked or thrown upwardly to the position shown in dotted lines in Fig. 4, in which position the rake is rendered inoperative. The bar 13 or any other suitable mechanism may be employed for raising and lowering the rake-head. The draft-bar 12 is similarly jointed and consists of a central section 14 and foldable end sections 15, which by their connections 10 and 11 with the foldable end sections 3 of the rake-head move in unison therewith in the folding and unfolding